(12) United States Patent
Jang et al.

(10) Patent No.: US 12,374,058 B2
(45) Date of Patent: Jul. 29, 2025

(54) ELECTRONIC DEVICE FOR USING VIRTUAL INPUT DEVICE AND OPERATION METHOD IN THE ELECTRONIC DEVICE

(71) Applicant: SAMSUNG ELECTRONICS CO., LTD., Suwon-si (KR)

(72) Inventors: Daechan Jang, Suwon-si (KR); Haksoo Kim, Suwon-si (KR); Chanmin Park, Suwon-si (KR); Sangwon Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/078,417

(22) Filed: Dec. 9, 2022

(65) Prior Publication Data

US 2023/0196689 A1 Jun. 22, 2023

Related U.S. Application Data

(63) Continuation of application No. PCT/KR2022/020066, filed on Dec. 9, 2022.

(30) Foreign Application Priority Data

Dec. 10, 2021 (KR) ........................ 10-2021-0176965

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/04842* (2013.01); *G06T 7/13* (2017.01);
(Continued)

(58) Field of Classification Search
None
See application file for complete search history.

(56) References Cited

U.S. PATENT DOCUMENTS

2006/0177112 A1   8/2006   Yang et al.
2013/0346168 A1   12/2013  Zhou
(Continued)

FOREIGN PATENT DOCUMENTS

JP   2014165660 A   9/2014
JP   2016039599     3/2016
(Continued)

OTHER PUBLICATIONS

Search Report dated Mar. 16, 2023 in International Patent Application No. PCT/KR2022/020066.
(Continued)

*Primary Examiner* — Yi Wang
(74) *Attorney, Agent, or Firm* — Nixon & Vanderhye, P.C.

(57) ABSTRACT

An example electronic device which, by at least one processor, may obtain an image corresponding to a real drawing by the camera module, detect an outline of at least one object included in the image, obtain at least one virtual button corresponding to a pattern of the outline of the at least one object, deploy the at least one virtual button in an area of the at least one object matching at least one real object included in the real drawing, and process a user interaction corresponding to a user input according to a movement of button control in an area of the at least one virtual button.

18 Claims, 14 Drawing Sheets

(51) Int. Cl.
  *G06F 3/04842* (2022.01)
  *G06T 7/13* (2017.01)
  *G06T 19/20* (2011.01)
  *G06V 20/20* (2022.01)

(52) U.S. Cl.
  CPC .............. *G06T 19/20* (2013.01); *G06V 20/20* (2022.01); *G06T 2200/24* (2013.01); *G06T 2219/2016* (2013.01)

(56) References Cited

U.S. PATENT DOCUMENTS

| | | | |
|---|---|---|---|
| 2014/0078043 A1 | 3/2014 | Kim | |
| 2014/0082514 A1* | 3/2014 | Sivaraman | G06F 3/0416 715/745 |
| 2015/0177831 A1 | 6/2015 | Chan | |
| 2015/0269783 A1 | 9/2015 | Yun | |
| 2017/0131964 A1 | 5/2017 | Baek et al. | |
| 2018/0275744 A1 | 9/2018 | Kingsbury et al. | |
| 2019/0265781 A1 | 8/2019 | Kehoe et al. | |
| 2019/0318167 A1 | 10/2019 | Agrawal et al. | |
| 2020/0089389 A1 | 3/2020 | Grasset et al. | |
| 2020/0097119 A1 | 3/2020 | Pahud et al. | |
| 2020/0117282 A1 | 4/2020 | Lee | |
| 2020/0193714 A1 | 6/2020 | Browy | |
| 2021/0405758 A1 | 12/2021 | Kim | |
| 2022/0172397 A1 | 6/2022 | Herling | |
| 2023/0152963 A1 | 5/2023 | Kim | |

FOREIGN PATENT DOCUMENTS

| | | |
|---|---|---|
| KR | 10-0718126 | 5/2007 |
| KR | 10-2015-0054825 | 5/2015 |
| KR | 10-2015-0075648 | 7/2015 |
| KR | 10-2015-0110285 | 10/2015 |
| KR | 10-2016-0010475 | 1/2016 |
| KR | 10-2017-0053280 | 5/2017 |
| KR | 10-2019-0001559 | 1/2019 |
| KR | 10-2019-0051028 | 5/2019 |
| KR | 10-2016681 | 8/2019 |
| KR | 10-2022-0005106 | 1/2022 |
| KR | 10-2022-0012073 | 2/2022 |

OTHER PUBLICATIONS

Written Opinion dated Mar. 16, 2023 in International Patent Application No. PCT/KR2022/020066.

* cited by examiner

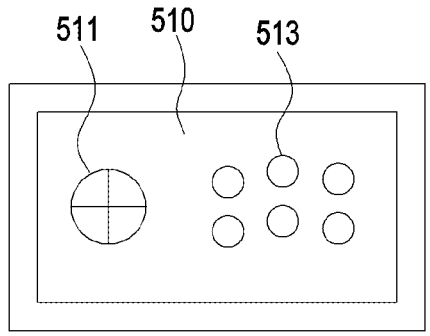
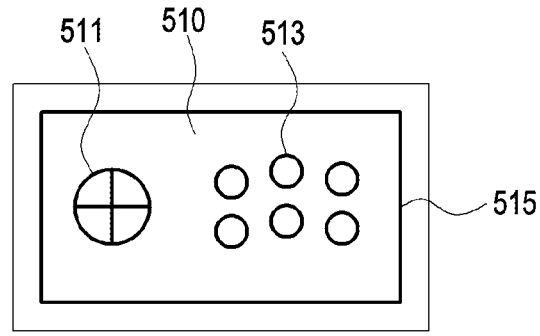
FIG. 5A  FIG. 5B
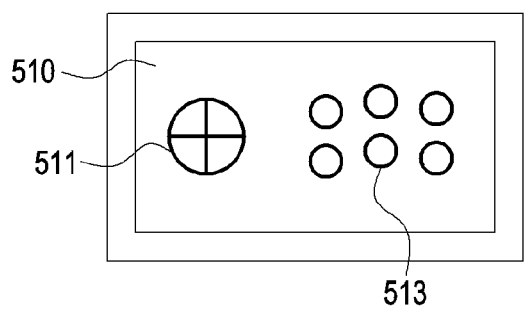
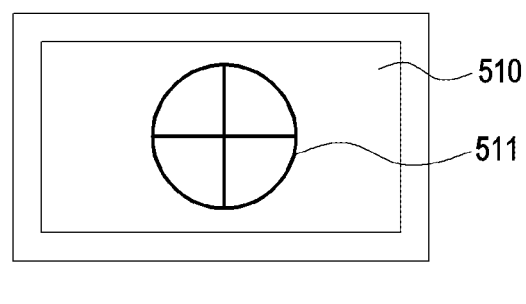
FIG. 5C  FIG. 5D
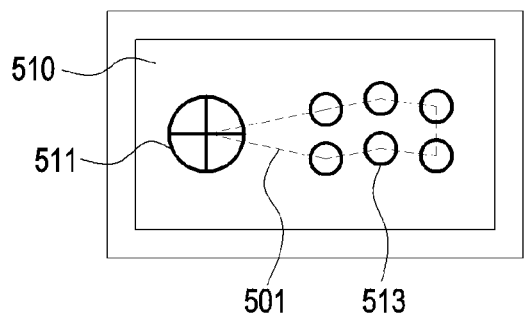
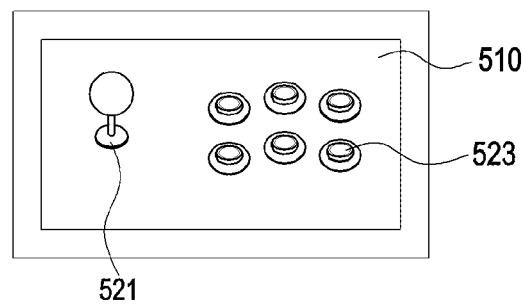
FIG. 5E  FIG. 5F

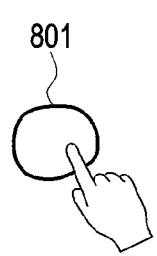 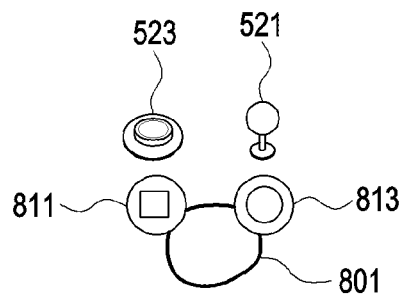
FIG. 8A    FIG. 8B
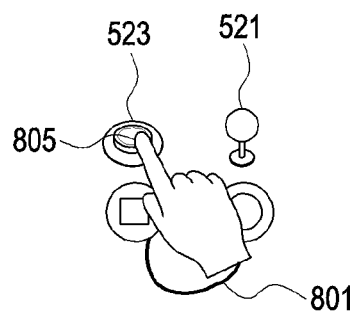 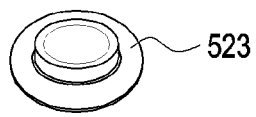
FIG. 8C    FIG. 8D

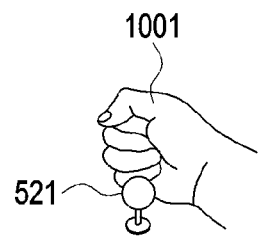
FIG. 10A   FIG. 10B
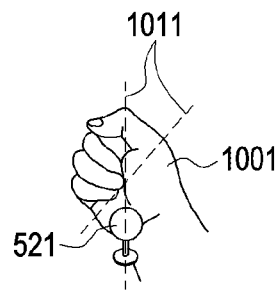 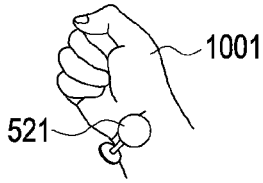
FIG. 10C   FIG. 10D

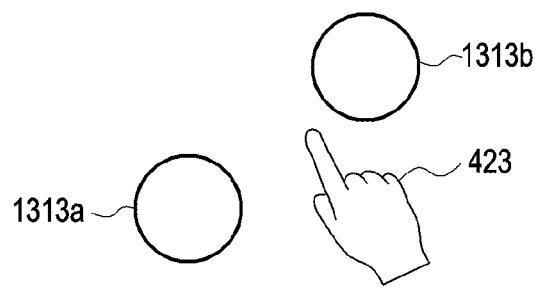
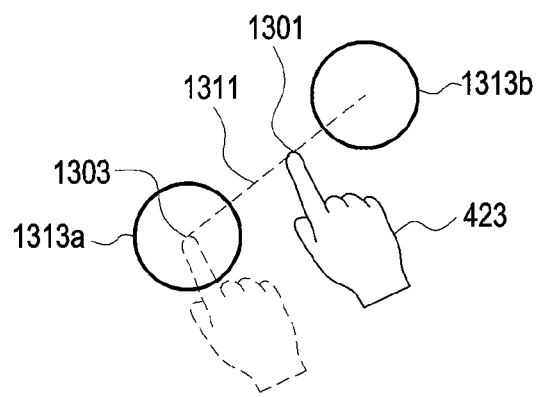
FIG. 13A      FIG. 13B
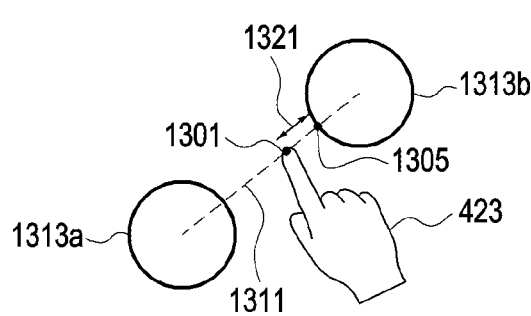
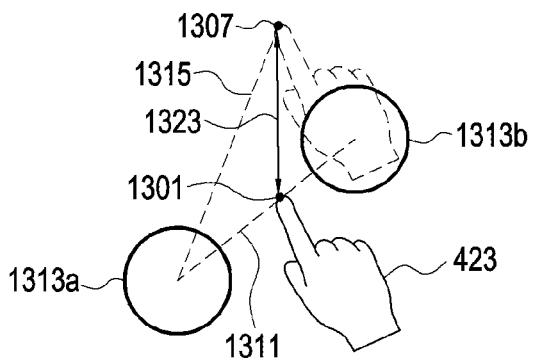
FIG. 13C      FIG. 13D

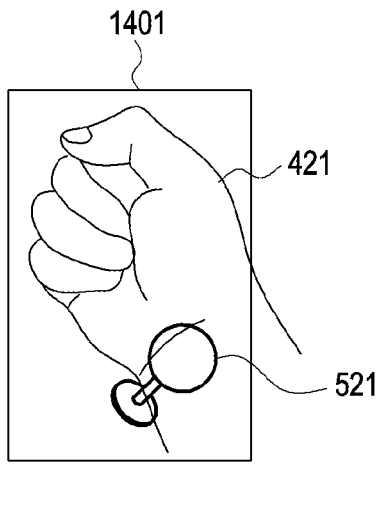
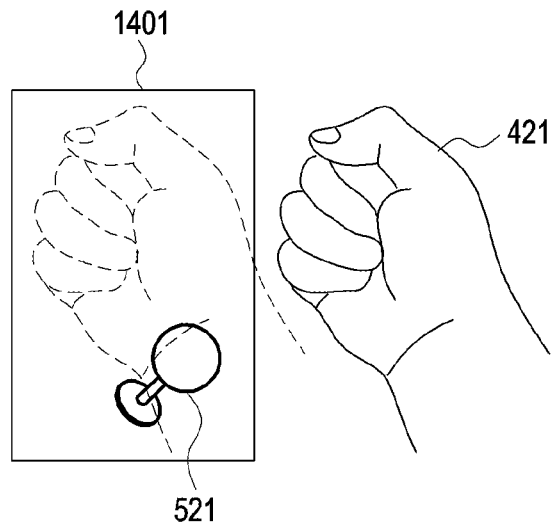
FIG. 14A  FIG. 14B
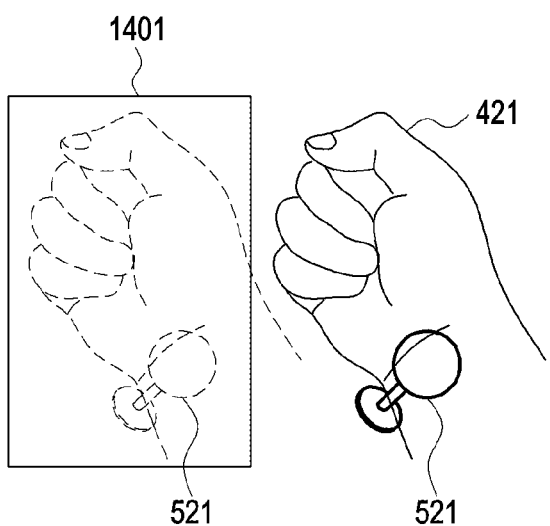
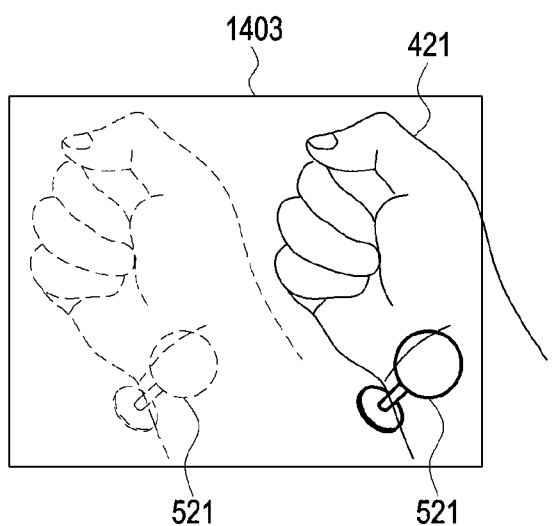
FIG. 14C  FIG. 14D

ELECTRONIC DEVICE FOR USING VIRTUAL INPUT DEVICE AND OPERATION METHOD IN THE ELECTRONIC DEVICE

CROSS-REFERENCE TO RELATED APPLICATIONS

This application is a PCT-Bypass Continuation of International Application No. PCT/KR2022/020066 designating the United States, filed on Dec. 9, 2022, in the Korean Intellectual Property Receiving Office and claiming priority to Korean Patent Application No. 10-2021-0176965, filed on Dec. 10, 2021, in the Korean Intellectual Property Office, the disclosures of each of which are incorporated by reference herein in their entireties.

BACKGROUND

Field

The disclosure relates to an electronic device for using a virtual input device and an operation method in the electronic device.

Description of Related Art

Recent electronic devices come in various form factors for user convenience purposes and provide diversified services or functions. Among information according to the execution of various services or functions of the electronic device, various services are provided by virtual reality technology.

Among virtual reality technologies, augmented reality (AR) is part of virtual reality and is a computer graphic scheme that allows a virtual object to look or appear present in an original environment by synthesizing the virtual object or information with the actual (real-world) environment. Augmented reality (AR) is a technique showing the user an overlap of a virtual thing or object on the real-life world the user sees with the user's eyes. It shows a single image obtained by mixing additional information and virtual world information with the real world in real-time, and thus, it is also called mixed reality (MR). Virtual reality (VR) refers to an environment or circumstance similar to a real-life environment as created by computer graphics and refers, for example, to an interface allowing a human being to feel it through sense organs as if the human being interacts with it. VR techniques allow the user to be immersed in VR environment, so that the user cannot view the actual environment. However, in AR, a combination of actual and VR objects, may allow the user to view the actual environment unlike existing VR reality, providing better life-like feelings and additional information.

AR technology has various applications in various reality environments, and its uses are expanding in smartphones, such as location-based services, mobile games, or education sectors.

SUMMARY

To control an augmented reality system in an augmented reality (AR) environment, a user can control a prepared virtual input device (e.g., a virtual keyboard) through the user's gesture or connect a physical input device (e.g., a Bluetooth joystick) to an AR device and controls it to use it as an input device.

In a conventional augmented reality system, the virtual input device (virtual keyboard) may be difficult to control, and the physical input device (e.g., a Bluetooth joystick) incurs a separate cost for purchase and may not take full advantage of AR environments.

According to an example embodiment of the disclosure, an electronic device for using a drawing made on a sheet of paper or object as a virtual input device and an operation method in the electronic device may be provided.

According to an example embodiment of the disclosure, an electronic device may include a memory, a camera module, and at least one processor electrically connected with the memory and the camera module, wherein the at least one processor is configured to obtain an image corresponding to a real drawing by the camera module, detect an outline of at least one object included in the image, obtain at least one virtual button corresponding to a pattern of the outline of the at least one object, deploy the at least one virtual button in an area of the at least one object matching at least one real object included in the real drawing, and process a user interaction corresponding to a user input according to a movement of button control in an area of the at least one virtual button.

According to an example embodiment, a method for operation in an electronic device may include obtaining an image corresponding to a real drawing by a camera module of the electronic device, detecting an outline of at least one object included in the image, obtaining at least one virtual button corresponding to a pattern of the outline of the at least one object, deploying the at least one virtual button in an area of the at least one object matching at least one real object included in the real drawing, and processing a user interaction corresponding to a user input according to a movement of button control in an area of the at least one virtual button.

According to various example embodiments, an electronic device for using a virtual input device and operation method in the electronic device may utilize drawings made on a surrounding object (paper or object) as various virtual input devices and can allow for immediate and simplified creation of a user customized input device without the need for purchasing a separate input device or without the need to download online information about buttons for a specific scenario (e.g., buttons for a specific game) and output or provide and use product packaging for product promotion, saving costs and allowing for wider use in various scenarios.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 5A, 5B, 5C, 5D, 5E, and 5F are views illustrating an example for using a virtual input device in an example electronic device according to an embodiment;

FIGS. 8A, 8B, 8C, and 8D are views illustrating an example for using a virtual input device in an example electronic device according to an embodiment;

FIGS. 10A, 10B, 10C, and 10D are views illustrating an example for using a virtual input device in an example electronic device according to an embodiment;

FIGS. 12A-1, 12A-2, 12A-3, 12A-4, 12B-1, and 12B-2 are views illustrating an example for using a virtual input device in an example electronic device according to an embodiment;

FIGS. 13A, 13B, 13C, and 13D are views illustrating an example for using a virtual input device in an example electronic device according to an embodiment; and FIGS. 14A, 14B, 14C, and 14D are views illustrating an example for using a virtual input device in an example electronic device according to an embodiment.

The same or similar reference denotations may be used to refer to the same or similar elements throughout the specification and the drawings.

DETAILED DESCRIPTION

Various embodiments of the present disclosure are now described with reference to the accompanying drawings. As used herein, the term "user" may denote a human or another device using the electronic device.

Figure 1:
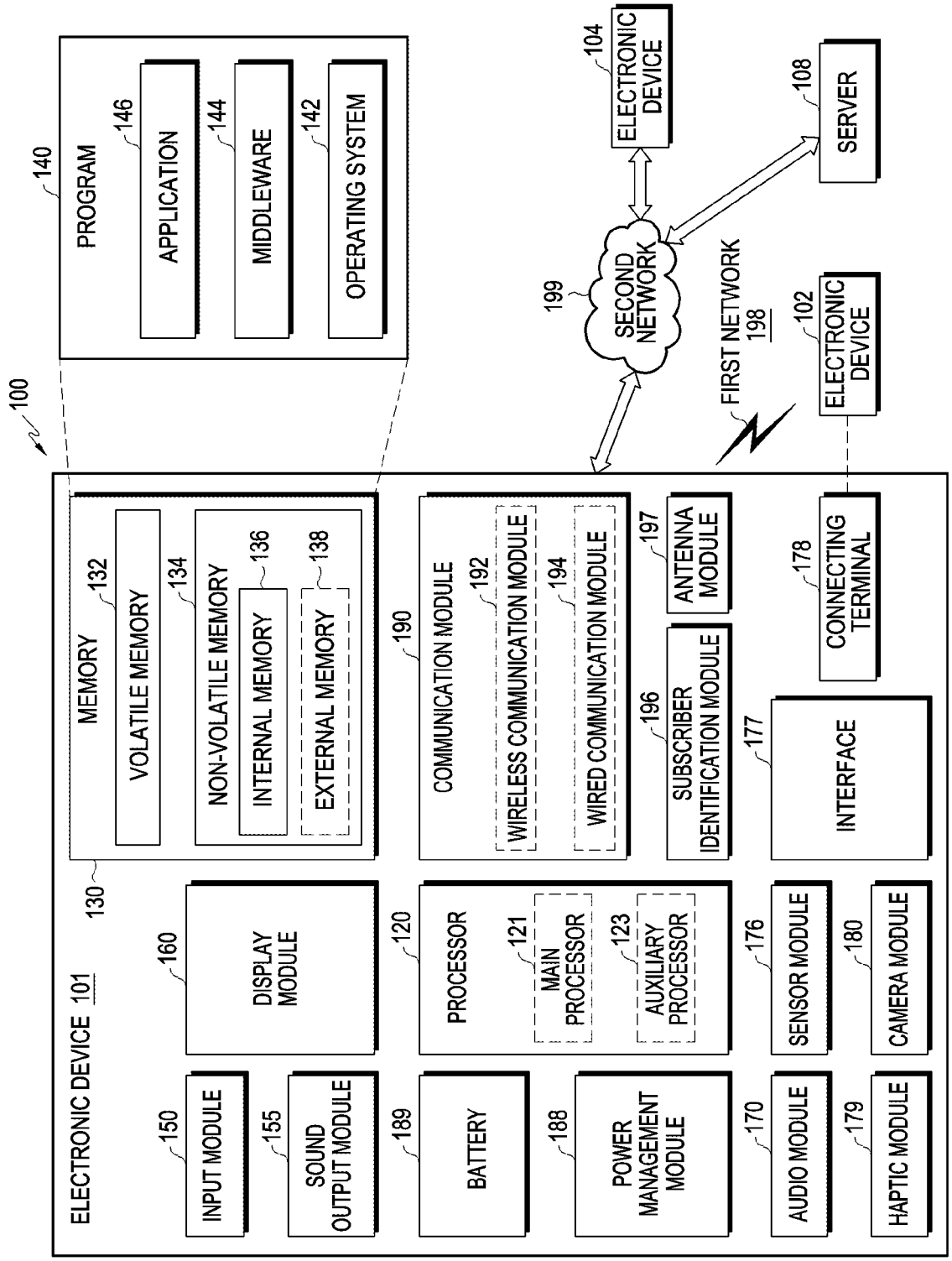
FIG. 1 is a view illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of or including a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
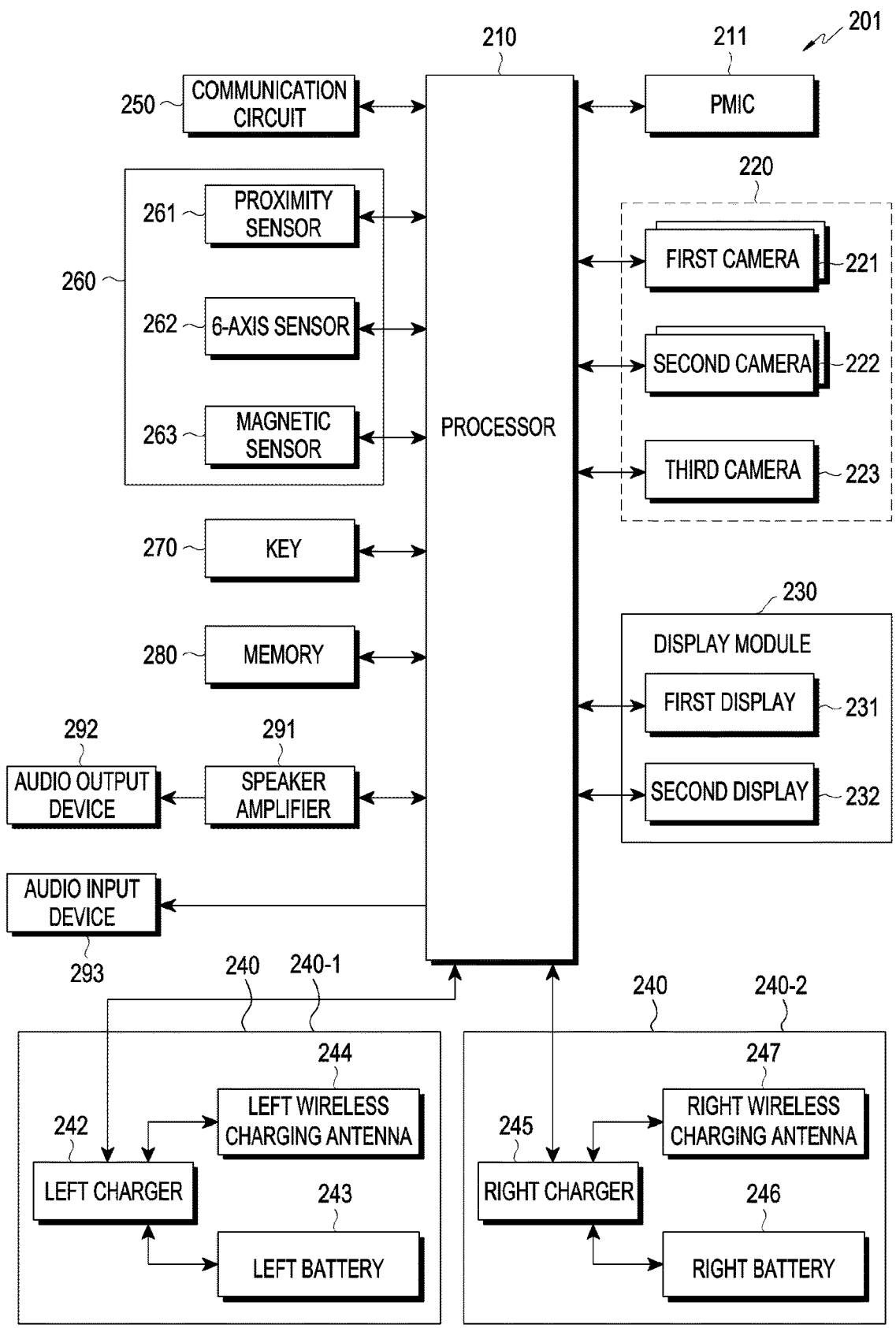
FIG. 2 is a block diagram illustrating an example electronic device for using a virtual input device according to an embodiment.
Figure 3:
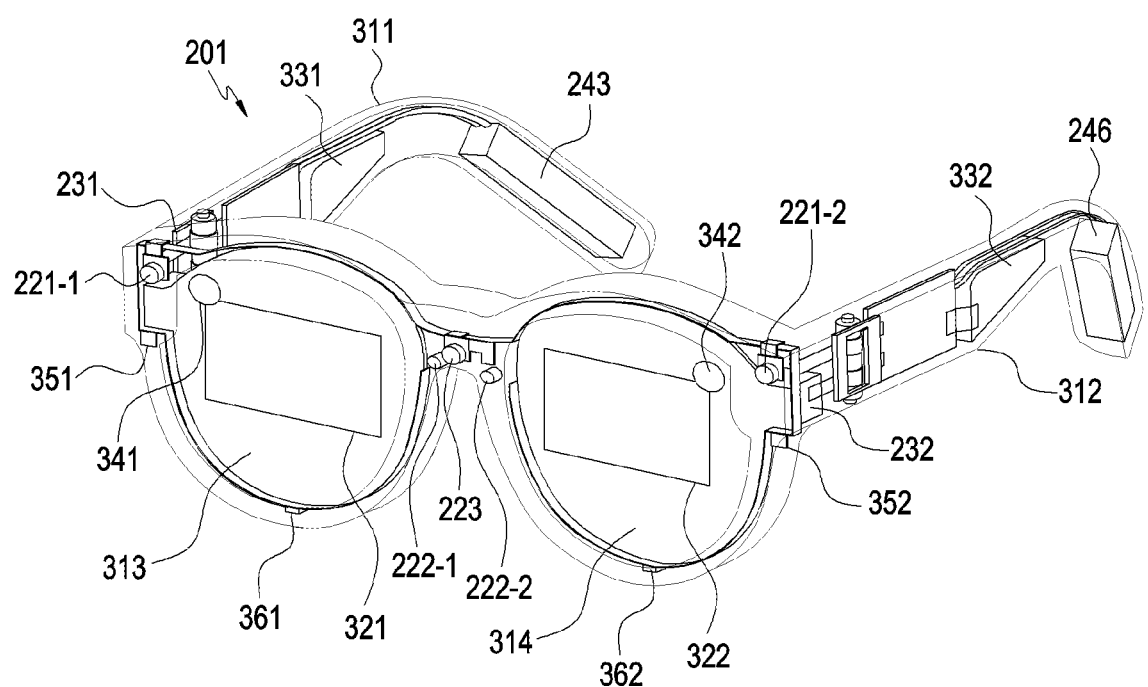
FIG. 3 is a perspective view illustrating an example electronic device for using a virtual input device according to an embodiment.

FIG. 2 is a block diagram illustrating an example electronic device for using a virtual input device according to an embodiment. FIG. 3 is a perspective view illustrating an example electronic device for using a virtual input device according to an embodiment.

Referring to FIGS. 2 and 3, according to an embodiment, an electronic device 201 may be an electronic device 102 or 104 communicating with the electronic device 101 of FIG. 1 or a device capable of providing a service related to virtual reality technology in an extended reality environment (XR) encompassing augmented reality (AR) or mixed reality (MR), similar to the electronic device 101 of FIG. 1. The electronic device 201 may use a real drawing made on a surrounding object (e.g., paper or an object) as a virtual input device for user interaction. The real drawing may include at least one real object to be used as at least one virtual button included in the virtual input device. As shown in FIG. 3, the electronic device 201 may be a device (e.g., a head-mounted display (HMD) or glasses-type device) configured to be worn on the user's body. For example, the electronic device 201 may be configured to couple with an external electronic device, e.g., a mobile device to be able to use the components (e.g., the display module, camera module, sound output module, or other components) of the external electronic device.

According to an embodiment, the electronic device 201 may include a processor 210, a PMIC 211, a camera module 220 including a plurality of cameras, a display module 230, a charging module 240, a communication module (circuit) 250, a sensor module 260, a key 270, a memory 280, a speaker amplifier 291, an audio output device 292, and an audio input device 293. In addition, the electronic device 201 may further include other components to provide a virtual input device.

According to an embodiment, the processor 210 (e.g., the processor 120 of FIG. 1) (e.g., including processing circuitry) may be electrically connected with the other components (e.g., the PMIC 211, the camera module 220 including the plurality of cameras, the display module 230, the charging module 240, the communication module 250, the sensor module 260, the key 270, the memory 280, the speaker amplifier 291, the audio output device 292, and the input device 293) of the electronic device 201 and control the other components. The processor 210 may perform various data processing or computations according to the execution of various functions (e.g., operations, services, or programs) provided by the electronic device 201. The processor 210 may perform various data processing or computations to provide a virtual input device for user interaction based on a real drawing made on a surrounding object.

According to an embodiment, the PMIC 211 may be electrically connected to the processor 210 and the charging module 240 and perform a control operation to convert the electric power stored in the first battery 223 and the second battery 226 to have current or voltage required by other components of the electronic device 201 and supply it.

According to an embodiment, the camera module 220 (e.g., the camera module 180 of FIG. 1) may include one or more first cameras (e.g., recognition cameras) 221: 221-1 and 221-2, one or more second cameras 222: 222-1 and 222-2, and one or more third cameras (e.g., capturing cameras) 223. According to various embodiments, the one or more first cameras (e.g., recognition cameras) 221-1 and 221-2 are cameras used for 3DoF or 6DoF head tracking, hand detection and tracking, and spatial recognition and may use global shutter (GS) cameras. Stereo cameras are required for head tracking and spatial recognition, so that two GS cameras with the same specifications and performance may be used. To detect quick hand motions and fine motions, such as of fingers, and track motions, GS cameras superior in performance (image drag) to rolling shutter (RS) cameras are primarily used. According to various embodiments, one or more first cameras (e.g., recognition cameras) 221: 221-1 and 221-2 may be RS cameras. The one or more first cameras 221: 221-1 and 221-2 may perform spatial recognition for 6DoF, a simulation language for alternative modeling (SLAM) function through depth capture, or the user gesture recognition function. One or more second cameras (e.g., eye tracking (ET) cameras) 222: 222-1 and 222-2 may be used for detecting and tracking pupils and are used for the purpose of allowing the center of the virtual image projected to the electronic device 201 (e.g., AR glasses) to be positioned according to the direction of the user's gaze. The one or more second cameras 222: 222-1 and 222-2 may be GS cameras that detect the pupils and track rapid pupil movements. According to various embodiments, the one or more first cameras (e.g., recognition cameras) 221: 221-1 and 221-2 may be positioned to face forward (e.g., the position shown in FIG. 3 or positions adjacent to the light sources 351 and 352). According to various embodiments, the second cameras (e.g., ET cameras) 222-1 and 222-2 may be installed for the left eye and the right eye, respectively, and may have the same performance and specifications. The third camera (e.g., a capture camera) 223 may be a high-resolution camera of high resolution (HR) or photo video (PV). According to various embodiments, as the third camera 223, a color camera equipped with functions for obtaining high-quality images, such as an auto focus (AF) function and an image stabilization (OIS) function, may be mainly used. According to various embodiments, the third camera 223 may be a GS camera or an RS camera.

According to an embodiment, the display module 230 (e.g., the display module 160 of FIG. 1) may include a first display 231 disposed on a first member 311 (e.g., a left member) and a second display 232 disposed on a second member 312 (e.g., a right member), e.g., a liquid crystal display (LCD), a digital mirror device (DMD), a liquid crystal on silicon (LCoS), or an organic light emitting diode (OLED), or a micro light emitting diode (micro LED). Although not shown, when the first display 231 and the second display 232 are formed of one of a liquid crystal display device, a digital mirror display device, or a silicon liquid crystal display device, the electronic device 201 may include a light source for radiating light to the screen output areas of the first display 231 and the second display 232. According to an embodiment, when the first display 231 and the second display 232 are implemented as, e.g., either organic light emitting diodes or micro LEDs, which are self-luminescent, the electronic device 201 may provide a virtual image of good quality to the user even when a separate light source is not included and be made lightweight. The electronic device 201 may include a first transparent member 313 and/or a second transparent member 314 and be used while worn on the user's face. The first transparent member 313 and/or the second transparent member 314 may be formed of a glass plate, a plastic plate, or a polymer and be made transparent or translucent. According to an embodiment, the first transparent member 313 may be disposed to face the user's right eye, and the second transparent member 314 may be disposed to face the user's left eye. According to various embodiments, when the first display 231 and the second display 232 are transparent, the electronic device 201 may be disposed in the positions facing the user's eyes to configure a screen display unit.

According to an embodiment, the electronic device 201 may dispose a first optical waveguide 321 in a partial area of the first transparent member 313 and a second optical waveguide 322 in a partial area of the second transparent member 314. The optical waveguides 321 and 322 serve to transfer the light generated by the first display 231 and the second display 232 to the user's eyes. The first optical waveguide 321 and the second optical waveguide 322 may be formed of glass, plastic, or polymer. The first optical waveguide 321 and the second optical waveguide 322 may include a nano pattern formed on one surface of the inside or outside, e.g., a grating structure having a polygonal or curved shape. According to an embodiment, the light incident on one end of the waveguides may be propagated inside the first optical waveguide 321 and the second optical waveguide 322 by nano-patterns and be provided to the user. Further, the first optical waveguide 321 and the second optical waveguide 322 configured of free-form prisms may provide the incident light to the user through reflection mirrors. The first optical waveguide 321 and the second optical waveguide 322 may include at least one diffractive element (e.g., a diffractive optical element (DOE) or a holographic optical element (HOE)), or a reflective element (e.g., a reflective mirror). The first optical waveguide 321 and the second optical waveguide 322 may guide the display light emitted from the light source to the user's eyes by at least one diffractive or reflective element included therein. According to various embodiments, the diffractive element may include an input optical member (e.g., first input optical member 341 and second input optical member 342)/output optical member (not shown). For example, the input optical member may mean an input grating area, and the output optical member (not shown) may mean an output grating area. The input grating area may serve as an input end that diffracts (or reflects) the light output from the light source (e.g., micro LED) to transfer the light to the first transparent member 313 and the second transparent member 314 of the screen display unit. The output grating area may serve as an exit for diffracting (or reflecting) the light transferred to the first transparent member 313 and the second transparent member 314 of the waveguides to the user's eyes. According to various embodiments, the reflective element may include a total internal reflection optical element or a total internal reflection waveguide for total internal reflection (TIR). For example, total internal reflection is a scheme for guiding light, and may refer, for example, to forming an incident angle to allow the light (e.g., virtual image) input through the input grating area to be 100% reflected on one surface (e.g., a specific surface) of the waveguide to be 100% transferred to the output grating area. In an embodiment, the light emitted from the first display 231 and the second display 232 may be guided by the waveguide through the input optical member. The light traveling inside the waveguides may be guided to the user's eyes through the output optical member. The screen display unit may be determined based on the light emitted in the direction to the eye.

According to an embodiment, the electronic device 201 may include a light source unit (illumination) (e.g., an LED) that may be used for various purposes depending on the position where the electronic device is attached. For example, the electronic device 201 may include a first light source unit 351 disposed in a partial area (e.g., around the frame) between the first member 311 and the first transparent member 313 and a second light source unit 352 disposed in a partial area between the second member 312 and the second transparent member 314. The light sources 351 and 352 are mainly used as auxiliary devices for facilitating gaze detection upon capturing the pupils with an ET camera, and an IR LED having an infrared wavelength rather than a visible light wavelength may be mainly used. As another example, the light source unit (e.g., LED) may be attached around the camera, along with the GS camera mounted around the hinge connecting the frame and the temple of the first member 313 or around the bridge connecting the frames. The light source unit (e.g., LED) may be mainly used to supplement the ambient brightness upon capturing with a GS camera, and may be effective when it is not easy to detect a subject to be captured due to a dark environment or the mixing of several light beams and reflections.

According to an embodiment, the electronic device 201 may include one or more printed circuit boards (PCBs) (e.g., a first printed circuit board (PCB) 331 and a second printed circuit board 332). For example, as illustrated in FIG. 3, the first printed circuit board (PCB) 331 may be disposed on the first member 311, and the second printed circuit board (PCB) 332 may be disposed on the second member 312. The first printed circuit board 331 and the second printed circuit board 332 (e.g., FPCB (flexible PCB)) may transfer electrical signals to each module (e.g., the camera module, display module, audio module or sensor module) and other printed circuit boards. According to various embodiments, the first printed circuit board 331 and the second printed circuit board 332 may be configured such that an interposer is disposed therebetween.

According to an embodiment, the charging module 240 (e.g., the charging module 189 of FIG. 1) may include a first charging module 240-1 disposed on the first member 311 of the electronic device 201 and a second charging module 240-2 disposed on the second member 312. The first charging module 240-1 may include a first (left) charger 242, a first (left) wireless charging antenna 244, and a first (left) battery 243, and the second charging module 240-2 may include a second (right) charger 245, a second (right) wireless charging antenna 247, and a second (right) battery 246.

According to an embodiment, the sensor module 260 (e.g., the sensor module 176 of FIG. 1) may include a proximity sensor 261, a 6-axis sensor 262, and/or a magnetic sensor 263 and may further include various other sensors for user interaction (e.g., an acceleration sensor, a gyro sensor, or a touch sensor).

According to an embodiment, the communication module (circuit) 250 (e.g., the communication module 190 of FIG. 1) may establish a communication channel with an external electronic device (e.g., the electronic device 102 or 104 or the server 108 of FIG. 1) and support communication through the established communication channel. According to an embodiment, the communication module 250 may include an antenna (not shown).

According to an embodiment, the memory 280 (e.g., the memory 130 of FIG. 1) may store various data used by at least one component (e.g., the processor 120 of FIG. 1 or the processor 210 of FIG. 2) of the electronic device 201 and commands (instructions) to perform the operations executed by the processor 210. The memory 280 may store applications. For example, the memory 130 may store an application (function or program) using the virtual input device.

The memory 280 may store various data generated during execution of the program 140, as well as a program (e.g., the program 140 of FIG. 1) used for functional operation. The memory 280 may include a program area 140 and a data area (not shown). The program area 140 may store relevant program information for driving the electronic device 201, such as an operating system (OS) (e.g., the OS 142 of FIG. 1) for booting the electronic device 201. The data area (not shown) may store transmitted and/or received data and generated data according to an embodiment. The memory 280 may include at least one storage medium of a flash memory, a hard disk, a multimedia card, a micro-type memory (e.g., a secure digital (SD) or an extreme digital (xD) memory), a random access memory (RAM), or a read only memory (ROM). According to an embodiment, the memory 280 may store deployment information, interaction information, or other information related to the virtual input device according to the operation for the electronic device 201.

According to an embodiment, the speaker amplifier 291 may be connected to the audio output module 292 (e.g., the sound output module 155 of FIG. 1), and may generate data to be transferred to the audio output module 292. The audio output device 292 may include a speaker. For example, when the electronic device 101 is of an AR glasses type as shown in FIG. 3, the speaker included in the audio output module 292 may be disposed on each of the partial areas of the first member 311 and the second member 312 to be disposed in a position adjacent to the user's ear when the user wears the electronic device. According to an embodiment, the audio input module (device) 293 (e.g., including a circuit) may include a first microphone 361 and a second microphone 362 respectively positioned adjacent to partial areas of the first transparent member 313 and the second transparent member 314.

Figure 4:
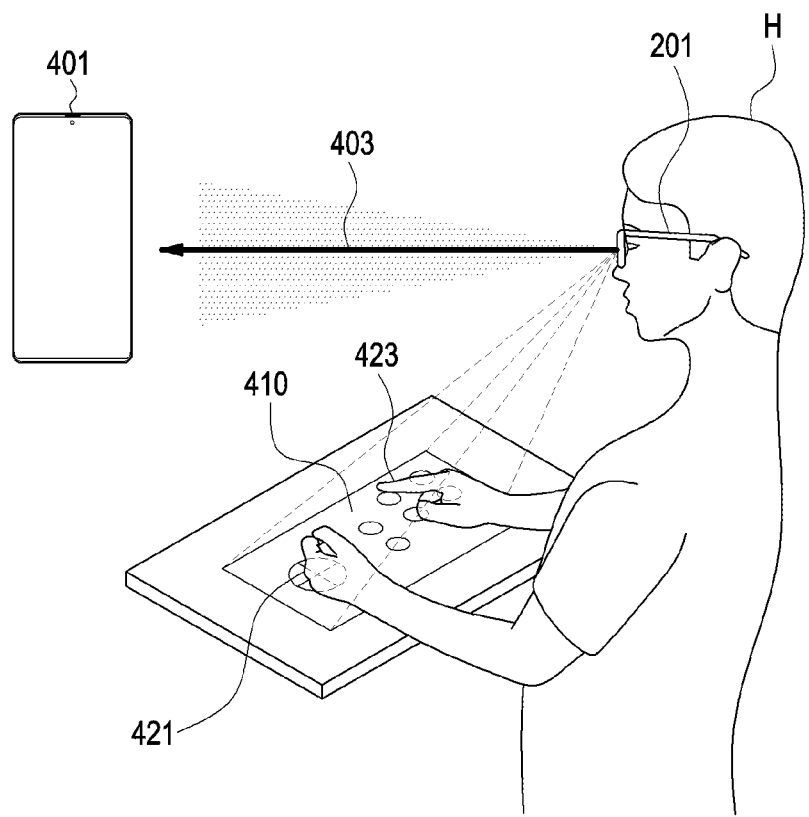
FIG. 4 is a view illustrating an example of wearing an example electronic device according to an embodiment.

FIG. 4 is a view illustrating an example of wearing an example electronic device according to an embodiment, and FIGS. 5A-5F are views illustrating an example for using a virtual input device in an example electronic device according to an embodiment.

Referring to FIGS. 2, 3, 4, and 5A-5F, according to an embodiment, the processor 210 (e.g., the processor 120 of FIG. 1) of the electronic device 201 may identify that the user wears the electronic device 201 on the body (e.g., the head) and, if an application of using a virtual input device is executed, perform an operation for setting the virtual input device. As illustrated in FIG. 4, in a state in which the user wears the electronic device 201, the processor 210 may control the camera module 220 to capture the real (real-world) drawing 410. For example, as shown in FIG. 4, upon displaying, through the external electronic device 401, a screen according to the execution of the application of using the virtual input device in interaction with the external electronic device 401, the first transparent member 313 and the second transparent member 314 of the electronic device 201 face in a first direction 403, so that the virtual input device may be provided in a position where control by a body part (e.g., hand 421 and/or 423) is comfortable. The real drawing 410 may be placed at a position convenient to control so as to match at least one virtual button provided as a virtual input device. For example, the electronic device 201 may temporarily or continuously capture the real drawing 410 through a camera (e.g., the third camera 223) included in the camera module 220 facing the real drawing 410 to capture the real drawing 410. As another example, when a capture request is received, the real drawing 410 may be captured by the camera (e.g., at least one of the first camera 211-1 or 211-2, the second camera 212-1 or 212-2, or the third camera 223) included in the camera module 220 disposed adjacent to the first transparent member 313 and the second transparent member 314 by a repositioning of the user wearing the electronic device 201.

According to an embodiment, the processor 210 may obtain an image 510 corresponding to the real drawing 410 captured by the camera module 220 as shown in FIG. 5A. The real drawing 410 may be a drawing that results from drawing at least one real object corresponding to a button to be virtually provided, on a surrounding object. For example, the real drawing 410 may be drawn by a user in a user customized manner or may be received from an external electronic device (e.g., a service providing device or server) or be provided along with a product, through the product promotion.

According to an embodiment, the processor 210 may detect the outline of at least one object 511 and 513 included in the obtained image 510 and the outline of the edge 515 of the object as shown in FIG. 5B. The processor 210 may control the display module 230 to apply a visual effect (e.g., a different color or a thicker line) to the outline of the edge 515 of the object and the outline of the at least one object 511 and 513 in the image 510 and display it, as shown in FIG. 5B. The processor 210 may filter out meaningless outlines (e.g., edges of images, dots, text or marks) having a pattern that does not correspond to a designated button shape among the detected outlines. For example, the processor 210 may control the display module 230 to remove the filtered outlines (e.g., the outline of the edge 515) and display only the outlines of the at least one object 511 and 513 having the pattern corresponding to the designated button shape as shown in FIG. 5C and FIG. 5D.

According to an embodiment, the processor 210 may obtain at least one virtual button 521 and 523 corresponding to the pattern (e.g., size and shape) of the detected outline of at least one object 511 and 513 as shown in FIG. 5C and FIG. 5D. As shown in FIG. 5E, the processor 210 may obtain deployment information about the at least one virtual button 521 and 523 from the memory 280 or external electronic device (e.g., the electronic device 102 or 104 of FIG. 1) and identify the deployment arrangement 501 of the at least one virtual button 521 and 523 based on the obtained deployment information. The processor 210 may deploy at least one virtual button 521 and 523 in the identified deployment arrangement 501 as shown in FIG. 5F. The processor 210 may set an area (or a detection area) of the at least one virtual button 521 and 523 based on the deployment information and may deploy at least one virtual button 521 and 523 matching the at least one object in the set area. The processor 210 may control the display module 230 to display at least one deployed virtual button 521 and 523. For example, the processor 210 may control the display module 230 to display at least one virtual button 521 and 523 in a virtual space as a 3D image. For example, the deployment information may include the identifier of at least one virtual button, the deployment position of the at least one virtual button (e.g., the coordinate value of the area in the virtual space), and a deployment arrangement (or deployment map) between one or more other mapped virtual buttons. For example, the area of the at least one virtual button may be an area of a virtual space in which at least a portion (e.g., a hand) of the user's body for controlling the at least one virtual button corresponds to the actual position.

According to an embodiment, when disposing the at least one virtual button, the processor 210 may deploy the at least one virtual button automatically based on deployment information about the at least one virtual button obtained from the memory or external electronic device (e.g., the electronic device 102 or 104 or server 108 of FIG. 1) or manually deploy the at least one virtual button in the deployment position selected by the user. When disposing at least one virtual button, the processor 210 may identify the position of the center point of the virtual button and the normal vector (e.g., an orthogonal vector of the center point) and may deploy the at least one virtual button in the virtual space (e.g., a 3D virtual space) corresponding to the area of at least one object included in the image using the identified center point position and the normal vector. For example, when the processor 210 retrieves deployment information about the virtual button from the memory or external electronic device, the processor 210 may load deployment information matching or similar to the deployment of at least one real object included in the real drawing 410. If the memory or external electronic device lacks the deployment information matching or similar to the deployment of at least one real object included in the real drawing 410, the processor 210 may manually deploy the virtual button in the deployment position selected by the user. For example, upon receiving a manual deployment request from the user, the processor 210 may manually deploy the virtual button in the deployment position selected by the user.

According to an embodiment, when manually deploying the virtual button, the processor 210 may manually deploy the at least one virtual button in an area selected by the user using, e.g., the user's designated gesture, eye tracking, or head tracking. For example, if the obtained deployment information is information that does not match but is similar in deployment, the processor 210 may display the obtained deployment information, as recommendation information, on the display module. If the user selects the recommended deployment information, the processor 210 may deploy at least one virtual button based on the recommended deployment information. For example, when deploying a plurality of virtual buttons based on deployment information about the plurality of virtual buttons, the processor 210 may deploy some of the plurality of virtual buttons based on obtained deployment information and deploy others of the plurality of virtual buttons manually in the area selected by the user through the manual deployment operation.

According to an embodiment, the processor 210 may correct the virtual buttons automatically deployed based on the obtained deployment information to positions where button control is convenient to thereby redeploy them. Although the obtained deployment information does not match the deployment arrangement of the at least one object included in the image, the processor 210 may correct the obtained deployment information to match the deployment arrangement of at least one object included in the image. The processor 210 may store the corrected deployment information in the memory 280 or register the corrected deployment information in the external electronic device providing the deployment information. For example, when the deployment arrangement of virtual buttons included in the obtained deployment information is a deployment arrangement for right-handed persons, the processor 210 may correct the deployment arrangement included in the deployment information to one for left-handed persons. For example, when the obtained deployment information is deployment information for a plurality of virtual buttons, the processor 210 may delete the deployment positions for some buttons among the plurality of virtual buttons to thereby correct the deployment arrangement. For example, the processor 210 may add a deployment position for an additional virtual button to the obtained deployment information to thereby correct the deployment arrangement.

According to an embodiment, the processor 210 may be configured to process a user interaction input in response to button control in the area of the at least one virtual button 521 and 523 and execute an event corresponding to the user interaction (e.g., a command to execute a function of a designated application in response to the user interaction).

According to an embodiment, when deploying at least one virtual button and performing the user interaction operation, the processor 210 may perform an operation for error handling on button recognition or enhancing the recognition of at least one button. The processor 210 may periodically or continuously identify the operation for identifying the recognition rate for at least one button to enhance the recognition of at least one button or handle errors in button recognition. For example, as shown in FIG. 5F, the processor 210 may deploy virtual buttons 521 and 523 and identify the recognition rate for each of the plurality of virtual buttons 521 and 523 continuously or upon button control while user interaction is performed by controlling a first button 521 among the plurality of virtual buttons by the user's body part, e.g., hand 421. The processor 210 may identify the position of at least one virtual button based on feature points of the objects included in the image 510 in the surrounding area or the deployment position of another button (e.g., a second button 523) deployed in the surrounding area of the button (e.g., the first button 521) identified as having a recognition rate of a designated threshold value or less. The processor 210 may deploy at least one hidden virtual button (e.g., the first button 521 or part of the first button 521 and second buttons 523) in the identified position and display a button image (e.g., a 3D image) corresponding to the at least one virtual button (e.g., the first button 521 or part of the first button 521 and second buttons 523).

According to an embodiment, the processor 210 may continuously perform the operation for identifying the recognition rate and the user interaction operation in the area of the at least one virtual button. Upon failing to identify at least one virtual button based on the feature point of the surrounding area or the deployment positions of the second buttons 523 deployed in the surrounding area, the processor 210 may determine that it is impossible to recognize a virtual button and control the display module 230 to display a message indicating that the recognition rate is low or virtual button recognition is impossible and/or control the audio output module 292 to output a sound corresponding to the message. The processor 210 may control the vibration module (not shown) to output vibration of the message indicating that the recognition rate is low or that virtual button recognition is impossible. The processor 210 may correct the deployment information about at least one virtual button or lead the user to remove the object hiding the at least one virtual button to increase the virtual button recognition rate.

According to an embodiment, upon identifying that the user input departs off the area of the at least one virtual button while performing the user interaction corresponding to the user input, the processor 210 may identify buttons present on the extension line of the first position where the current user input is detected and the second position detected before. The processor 210 may correct (e.g., extend to the currently detected first position) the area (or detection area) of the virtual button for processing user interaction. If no button exists on the extension line or a designated maximum distance from the first position is exceeded, the processor 210 may disregard the user input without handling it as user interaction.

According to an embodiment, if the position of the user's body part (e.g., hand 421 or 423 of FIG. 4) departs off the area (or detection area) of the at least one button (e.g., the button 521 or 523 of FIG. 5F) while performing the user interaction, the processor 210 may correct the area (or position) of the at least one button. The processor 210 may display the image (e.g., 3D image) corresponding to the at least one button (e.g., the button 521 or 523 of FIG. 5F) in the correction position. Despite departing off the area (or detection area) of the at least one button while the same user interaction for at least one button continues, the processor 210 may determine that the user interaction is valid, process the user interaction, and execute the corresponding event. When the user interaction does not continue but stops, the processor 210 may reset the detection area of the first button 521 for the next user interaction from the correction area to the pre-correction area.

Main components of the electronic device 101 of FIG. 1 or the electronic device 201 of FIGS. 2 and 3 have been described above in connection with FIGS. 1 and 3. According to an embodiment, however, all of the components of FIGS. 1, 2, and 3 are not essential components, and the electronic device 101 or 201 may be implemented with more or fewer components than those shown. The positions of the major components of the electronic device 101 or 201 described above in connection with FIGS. 1, 2, and 3 may be varied according to various embodiments of the disclosure.

According to an embodiment, an electronic device (e.g., the electronic device 101 of FIG. 1 or the electronic device 201 of FIG. 2) may include a memory (e.g., the memory 130 of FIG. 1 or the memory 280 of FIG. 2), a camera module (e.g., the camera module 180 of FIG. 1 or the camera module 220 of FIG. 2), and at least one processor (e.g., the processor 120 of FIG. 1 or the processor 210 of FIG. 2 electrically connected with the memory and the camera module. The at least one processor may be configured to obtain an image (e.g., the image 510 of FIG. 5) corresponding to a real drawing (e.g., the real drawing 410 of FIG. 4) using the camera module, detect an outline of at least one object included in the image, obtain at least one virtual button corresponding to a pattern of the outline of the at least one object, deploy the at least one virtual button in an area of the at least one object matching at least one real object included in the real drawing, and process a user interaction corresponding to a user input according to a movement of button control in an area of the at least one virtual button.

According to an embodiment, the electronic device may further include a display module (e.g., the display module 160 of FIG. 1 or the display module 230 of FIG. 2) electrically connected with the at least one processor. The at least one processor may be configured to execute an event corresponding to the user interaction and control the display module to display a dynamic image corresponding to the user input according to the movement of button control and information related to the event.

According to an embodiment, the at least one processor may be configured to control the display module to display the at least one virtual button deployed in the area of the at least one virtual button based on deployment information.

According to an embodiment, the at least one processor may be configured to obtain deployment information about the at least one virtual button from the memory or an external electronic device and deploy the at least one virtual button in the area of the at least one virtual button based on the deployment information, wherein the at least one virtual button is matched with the at least one object.

According to an embodiment, the at least one processor may be configured to, based on identifying that the at least one virtual button matching the deployment information does not exist, deploy the at least one virtual button in a position selected by a user.

According to an embodiment, the at least one processor may be configured to filter a meaningless outline from the image and detect an outline of the at least one object.

According to an embodiment, the at least one processor may be configured to identify a recognition rate of the at least one virtual button while processing the user interaction, and when the recognition rate of the at least one virtual button is a designated threshold value or less, identify a position where the at least one virtual button is deployed based on a feature point of a surrounding area of the at least one virtual button or a deployment position of another virtual button deployed in the surrounding area.

According to an embodiment, the at least one processor may be configured to, when the user interaction is identified in a position out of the area of the at least one virtual button, set an extension line of a first position where the user interaction occurs and a second position where a user interaction has occurred before, identify the at least one virtual button included on the extension line, when a distance between a point where the at least one virtual button meets the extension line and the first position is within a designated distance, correct and process an error in the user interaction, and execute an event corresponding to the user interaction.

According to an embodiment, the at least one processor may be configured to, when a user's body part is detected in another area adjacent to the area of the at least one virtual button while processing the user interaction, set a corrected area by extending the area to the other area while the user interaction is maintained, change a deployment position of the at least one virtual button to a position where the body part is detected in the corrected area and execute an event corresponding to the user interaction, and reset the corrected area to the area when the user interaction is stopped.

Figure 6:
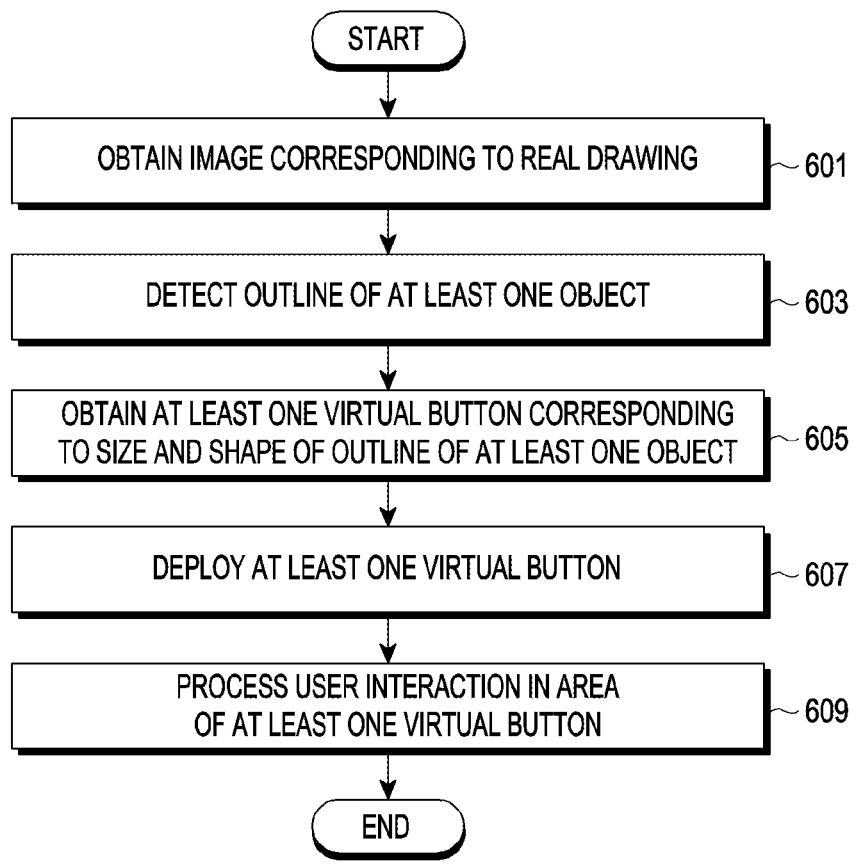
FIG. 6 is a flowchart illustrating an operation method in an example electronic device for using a virtual input device according to an embodiment.

FIG. 6 is a view illustrating an example operation method in an example electronic device for using a virtual input device according to an embodiment.

Referring to FIG. 6, according to an embodiment, an electronic device (e.g., the electronic device 101 of FIG. 1 or the electronic device 201 of FIG. 2) may obtain an image corresponding to a real drawing, by a camera module (e.g., the camera module 180 of FIG. 1 or the camera module 220 of FIG. 2) in operation 601.

In operation 603, the electronic device may detect the outline of at least one object included in the image. The electronic device may display a visual effect (e.g., a different color or thicker line) to the outline of the at least one object (e.g., objects 511 and 513 in FIG. 5). The electronic device may filter out meaningless outlines having a shape or pattern not corresponding to a designated button shape among the detected outlines.

In operation 605, the electronic device may obtain at least one virtual button corresponding to the pattern (e.g., size and shape) of the outline of the at least one object.

In operation 607, the electronic device may deploy at least one virtual button in the area of at least one object matching at least one real object included in the real drawing. When disposing the at least one virtual button, the electronic device may deploy the at least one virtual button automatically based on deployment information about the at least one virtual button obtained from the memory (e.g., the memory 130 of FIG. 1 or the memory 280 of FIG. 2) or external electronic device or manually deploy the at least one virtual button in the deployment position selected by the user. When disposing at least one virtual button, the electronic device may identify the position of the center point of the virtual button and the normal vector (e.g., an orthogonal vector of the center point) and may deploy the at least one virtual button in the virtual space (e.g., a 3D space) corresponding to the area of at least one object included in the image using the identified center point position and the normal vector. The electronic device may control the display module (e.g., the display module 160 of FIG. 1 or the display module 230 of FIG. 2) to display at least one deployed virtual button (e.g., buttons 521 and 523 in FIG. 5).

In operation 609, the electronic device may process a user interaction input in response to a movement according to button control in the area of the at least one virtual button and execute an event corresponding to the user interaction. The electronic device may display a dynamic image corresponding to the movement by the button control and information related to the event. The user interaction may correspond to a movement of the user's body part or a change in the movement according to the button control detected in the area of the at least one virtual button.

Figure 7:
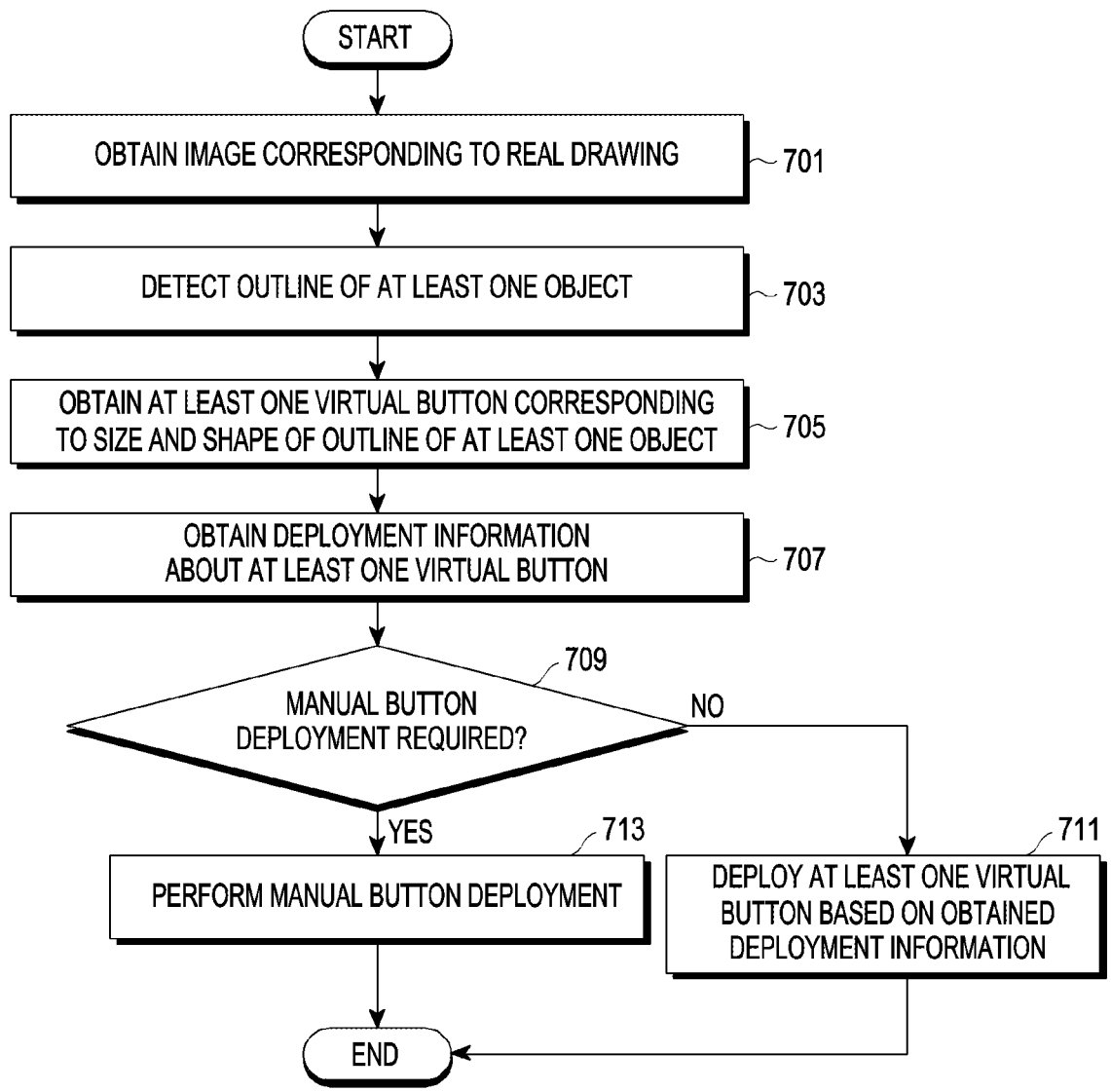
FIG. 7 is a flowchart illustrating an operation method in an example electronic device for using a virtual input device according to an embodiment.

FIG. 7 is a view illustrating an example operation method in an example electronic device for using a virtual input device in an augmented reality environment according to an embodiment.

Referring to FIG. 7, according to an embodiment, an electronic device (e.g., the electronic device 101 of FIG. 1 or the electronic device 201 of FIG. 2) may obtain an image corresponding to a real drawing, by a camera module (e.g., the camera module 180 of FIG. 1 or the camera module 220 of FIG. 2) in operation 701.

In operation 703, the electronic device may detect the outline of at least one object included in the image. The electronic device may remove meaningless outlines (e.g., the edge of the image, dots, text, or marks) irrelevant to the shape of the virtual button among the outlines detected in the image, through an outline filtering operation.

In operation 705, the electronic device may obtain at least one virtual button corresponding to the pattern (e.g., size and shape) of the outline of the at least one object.

In operation 707, the electronic device may obtain deployment information about at least one virtual button. When retrieving the deployment information, the electronic device may identify the similarity between the retrieved deployment information and the arrangement of the objects included in the image and read, from a memory, or receive, from a server through communication connection, matching or similar deployment information. For example, the electronic device may load or receive, from the server, the obtained deployment information in response to a deployment information retrieval request according to selection on a designated menu of the settings screen or a designated gesture and display it on the display module. The deployment information may include the identifier of at least one virtual button, the position information about the at least one virtual button (e.g., the coordinate value of the area), and a deployment arrangement (or deployment map) between mapped virtual buttons.

In operation 709, the electronic device may identify whether manual deployment of the virtual buttons is required based on the obtained deployment information. When it is identified that the deployment information matches so that manual deployment of the virtual buttons is not required, the electronic device may perform operation 711. When the deployment information does not match so that manual deployment of the virtual buttons is required, the electronic device may perform operation 713.

In operation 711 (yes in operation 709), the electronic device may deploy the at least one virtual button in the area of the virtual space based on the obtained deployment information and display the at least one deployed virtual button on the display module. For example, the at least one virtual button may be displayed, as a 3D image, on the display module.

In operation 713 (no in operation 709), the electronic device may perform a manual deployment operation for the virtual buttons. When manually deploying the virtual button, the electronic device may manually deploy the at least one virtual button in the area selected by the user using, e.g., the user's designated gesture, eye tracking, or head tracking. For example, if the obtained deployment information is information that does not match, but is similar to, the deployment of the object or objects included in the image, the electronic device may display the deployment information obtained for manual virtual button deployment, as recommendation information, on the display module. If the user selects the recommended deployment information, the electronic device may deploy at least one virtual button based on the recommended deployment information. For example, when deploying a plurality of virtual buttons based on deployment information about the plurality of virtual buttons, the electronic device may deploy some of the plurality of virtual buttons based on obtained deployment information and deploy others of the plurality of virtual buttons manually in the area selected by the user through the manual deployment operation.

FIGS. 8A, 8B, 8C, and 8D are views illustrating an example for using a virtual input device in an example electronic device according to an embodiment.

Referring to FIG. 8, according to an embodiment, in operation 711, when performing a manual virtual button deployment operation, if the outline 801 in FIG. 8A is extracted from the image, the electronic device (e.g., the electronic device 101 of FIG. 1 or the electronic device 201 of FIG. 2) may identify the pattern (e.g., size and shape) of the selected outline 801 and display virtual buttons 821 and 823 (FIG. 8B) having similar or identical shapes 811 and 813 based on the identified size and shape. If the user selects one 823 (FIG. 8C) from among the displayed virtual buttons 821 and 823, the electronic device may deploy the selected virtual button 823 in the position of the area selected by the user (FIG. 8D).

Figure 9:
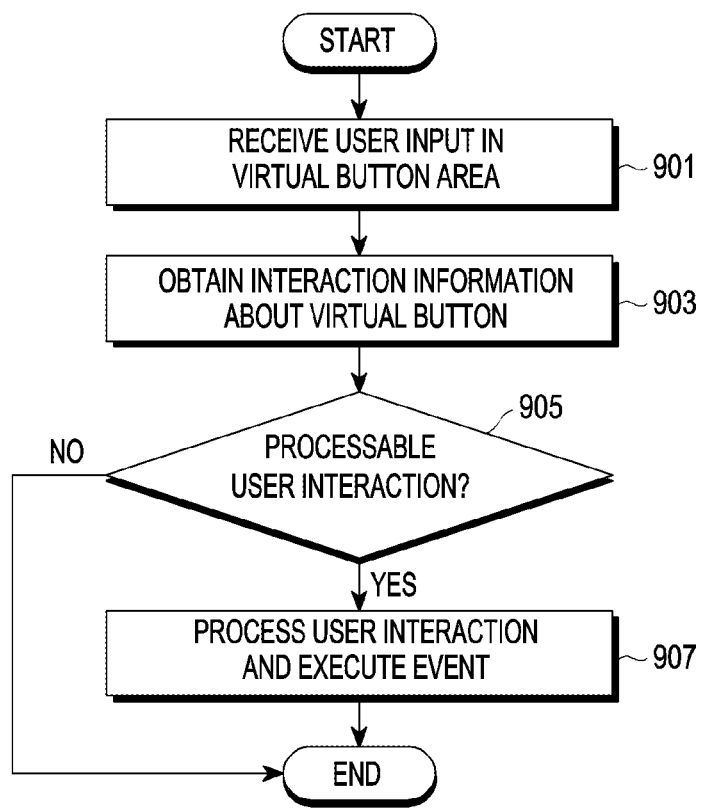
FIG. 9 is a flowchart illustrating an operation method in an example electronic device for using a virtual input device according to an embodiment.

FIG. 9 is a flowchart illustrating an example operation method in an example electronic device for using a virtual input device in an augmented reality environment according to an embodiment. FIG. 10 is a view illustrating an example for using a virtual input device in an example electronic device according to an embodiment.

According to an embodiment, the electronic device (e.g., the electronic device 101 of FIG. 1 or the electronic device 201 of FIG. 2) may deploy at least one virtual button as in the operation methods of FIGS. 6 and 7 and perform a user interaction operation according to button control by the user in the area where the at least one virtual button is deployed.

Referring to FIGS. 9 and 10, in operation 901, as shown in FIGS. 10A, 10B, and 10C, the electronic device may identify the body part 1001 (e.g., hand) according to the button control by the user in the area of a first virtual button 521 (e.g., joystick) among the at least one virtual button and receive a user input according to a movement of the identified body part 1001 (e.g., at least one of a movement of a hand or finger, a movement of the first axis, a touch input, or gaze concentration) or a movement change 1011.

In operation 903, the electronic device may obtain interaction information set in the first virtual button 521. Based on the obtained interaction information, the electronic device may identify only the user input corresponding to the set interaction, rather than processing the user interaction for all user inputs, to thereby process the user interaction corresponding to the identified user input. Thus, the electronic device may reduce performance issues that may be caused by receiving all interactions from the first virtual button 521 or may reduce unnecessary computations by processing only necessary user interactions on the button.

In operation 905, the electronic device may identify whether the user input is a user interaction processable in the area of the first virtual button 521 based on the obtained interaction information. If it is identified that the user input is a processable user interaction, the electronic device may perform operation 907. If it is identified that the user input is not a processable user interaction, the electronic device may terminate the operation or wait to receive a next user input.

In operation 907 (yes in operation 905), as shown in FIG. 10D, the electronic device may process the user interaction identified for the first virtual button 521 and execute the event (or command) corresponding to the processed user interaction. Upon processing the identified user interaction, the electronic device may apply the changed state to at least one virtual button and, if a trigger (e.g., at least one of a sound, light, or animation) is set for the changed state, execute the set trigger. For example, as shown in FIG. 10D, the electronic device may display an operation animation (including, e.g., a change in hand movement and a change in button movement) of the at least one virtual button corresponding to the user interaction processed according to a change in the user's movement.

Figure 11:
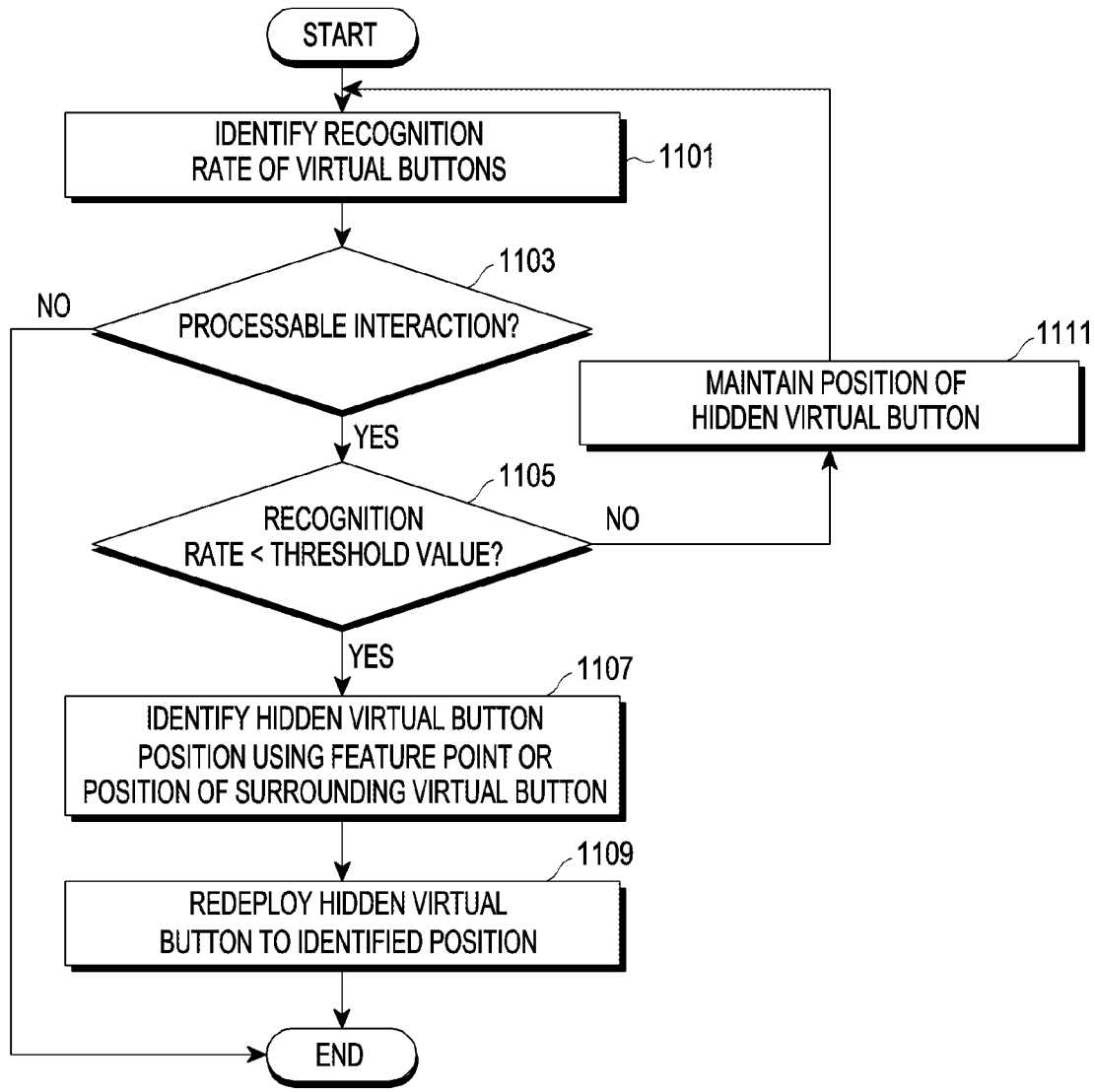
FIG. 11 is a flowchart illustrating an operation method in an example electronic device for using a virtual input device according to an embodiment.
Figures 1, 12A:
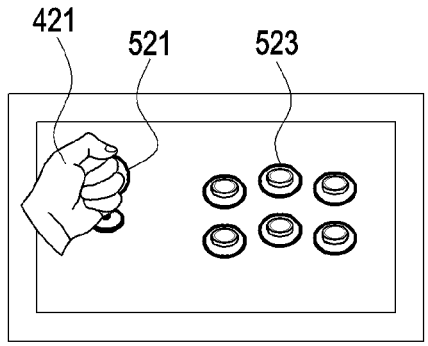
Figures 2, 12A:
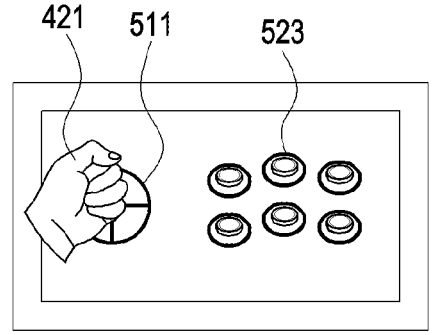
Figures 3, 12A:
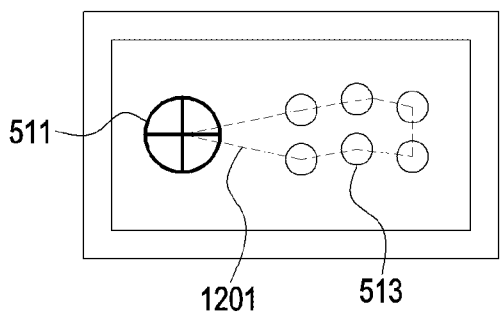
Figures 4, 12A:
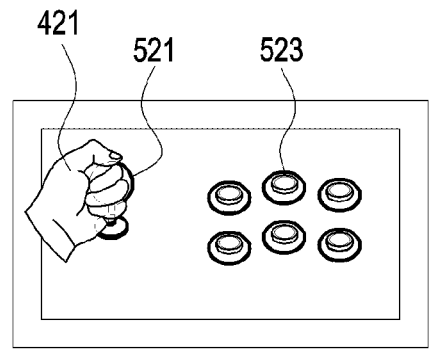
Figures 1, 12B:
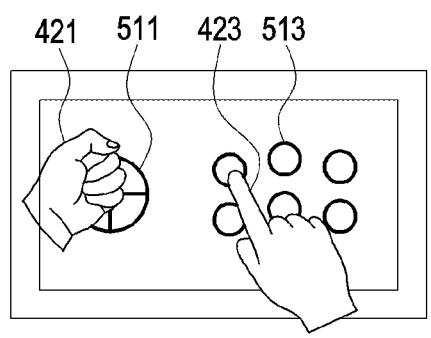
Figures 2, 12B:
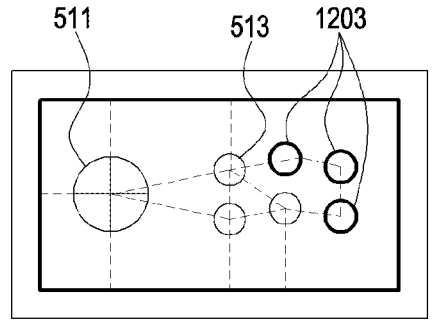

FIG. 11 is a flowchart illustrating an example operation method in an example electronic device for using a virtual input device according to an embodiment. FIGS. 12A and 12B are views illustrating an example for using a virtual input device in an example electronic device according to an embodiment.

According to an embodiment, the electronic device (e.g., the electronic device 101 of FIG. 1 or the electronic device 201 of FIG. 2) may deploy at least one virtual button as in the operation methods of FIGS. 6 and 7 and perform a user interaction operation according to button control by the user in the area where the at least one virtual button is deployed. When deploying at least one virtual button and performing the user interaction operation, the electronic device may perform an operation for error handling on button recognition or enhancing the recognition of at least one button.

Referring to FIGS. 11, 12A-1, 12A-2, 12A-3, 12A-4, 12B-1, and 12B-2, in operation 1101, according to an embodiment, the electronic device may deploy virtual buttons 521 and 523 as shown in FIG. 12A-1 and identify the recognition rate (or pattern recognition rate) for each of the virtual buttons 521 and 523 continuously or upon button control while user interaction is performed by controlling a first button 521 among the plurality of virtual buttons by the user's body part, e.g., hand 421.

In operation 1103, the electronic device may identify whether the user interaction corresponding to the user input according to the button control is a processable user interaction. If it is identified that the user interaction is a processable user interaction, the electronic device may perform operation 1105, otherwise, the operation is terminated.

In operation 1105, the electronic device may identify whether there is a button whose recognition rate is less than or equal to a designated threshold. If it is identified that there is a button whose recognition rate is less than or equal to the designated threshold, the electronic device may perform operation 1107. If it is identified that there is no button whose recognition rate is less than or equal to the designated threshold, the electronic device may perform operation 1111.

In operation 1107 (yes in operation 1103), the electronic device may identify the position of at least one virtual button based on feature points of the surrounding area or the deployment position of another button (e.g., a second button 523) deployed in the surrounding area of the button (e.g., the first button 521) identified as having a recognition rate of a designated threshold value or less. For example, the electronic device may identify that the recognition rate is reduced to the designated threshold value or less as the first button 521 among the plurality of virtual buttons 521 and 523 as shown in FIG. 12A-2 or the plurality of virtual buttons 521 and 523 as shown in FIG. 12B-1 are hidden by the user's body parts, e.g., two hands 421 and 423. For example, when the first button 521 among the plurality of virtual buttons 521 and 523 is hidden, the electronic device may identify the deployment position of one or more second buttons 523 matching one or more second objects 513 included in the image 510 based on the deployment arrangement 1201 included in the deployment information as shown in FIG. 12A-3 and identify the deployment position of the first button 521 based on the identified deployment position. For example, when the first button 521 and part of the second buttons 523 among the plurality of virtual buttons 521 and 523 are hidden, the electronic device may identify the positions of the hidden first button 521 and part of the second buttons 523 based on the feature point 1203 of the objects in the surrounding area included in the image, as shown in FIG. 12B-2.

In operation 1109, the electronic device may redeploy at least one hidden virtual button (e.g., the first button 521 or part of the first button 521 and second buttons 523) in the identified position and display a button image (e.g., a 3D image) corresponding to the at least one virtual button (e.g., the first button 521 or part of the first button 521 and second buttons 523). The electronic device may terminate the operation for enhancing the recognition rate.

In operation 1111 (no in operation 1105), the electronic device may maintain the position of the hidden virtual button and execute an event (or command) corresponding to the processed user interaction to process the user interaction. For example, the electronic device may identify the pressed state of the hidden virtual button and, if a trigger (e.g., at least one of a sound, light, or animation) corresponding to the pressed state is set, execute the set trigger. The electronic device may display an operation animation (including, e.g., a change in hand movement and a change in button movement) corresponding to the user interaction processed according to a change in the user's movement. Thereafter, the electronic device may perform operation 1101 to continuously perform the operation for identifying the recognition rate and the user interaction operation in the area of the at least one virtual button.

According to an embodiment, upon failing to recognize at least one virtual button based on the feature point of the surrounding area or the deployment position of the second button deployed in the surrounding area, the electronic device may determine that virtual button recognition is impossible and display a message indicating that the recognition rate is low or virtual button recognition is impossible on the display module (e.g., the display module 160 of FIG. 1 or the display module 230 of FIG. 2) and/or output a sound of the message through the sound output module (e.g., the sound output module 155 of FIG. 1 or the audio output module 292 of FIG. 2). The electronic device may output a vibration of the message indicating that the recognition rate is low or virtual button recognition is impossible through the vibration module. The electronic device may correct the deployment information about at least one virtual button or lead the user to remove the object hiding the at least one virtual button to increase the virtual button recognition rate.

FIGS. 13A, 13B, 13C, and 13D are views illustrating an example for using a virtual input device in an example electronic device according to an embodiment.

Referring to FIGS. 13A-13D, according to an embodiment, the electronic device (e.g., the electronic device 101 of FIG. 1 or the electronic device 201 of FIG. 2) may identify that the user input (e.g., the position of the touch by the user's body part 423 (e.g., hand)) for button control departs off the areas (first area 1313*a* and second area 1313*b*) of virtual buttons as shown in FIG. 13A. In such a case, the electronic device may identify virtual buttons in the first area 1313*a* and second area 1313*b* present on the extension line 1311 of the first position 1301 currently detected and the second position 1303 detected before, as shown in FIG. 13B. As shown in FIG. 13C, the electronic device may identify the interval 1321 between the position 1305 where the extension line 1311 and the second area 1313*b* meet and the currently detected first position 1301 and, if the distance value of the identified interval 1321 is smaller than a designated maximum distance value, process the user interaction corresponding to the user input (e.g., button control movement) by the user's body part 423 (e.g., hand). The electronic device may correct (e.g., extend to the currently detected first position 1301) the second area (or detection area) 1313*b* for processing the user interaction. As shown in FIG. 13D, upon detecting the user's body part 423 (e.g., hand) in the third position 1307 due to movement, the electronic device may identify that there is no virtual button on the extension line 1315 of the third position 1307 and the first area 1313*a* and disregard, rather than processing as a user interaction, the user input by the user's body part 423. As shown in FIG. 13D, if the distance value of the interval 1323 between the first position 1301 and the third position 1307 exceeds the designated maximum distance value, the electronic device may disregard, rather than processing as a user interaction, the user interaction by the user's body part 423.

FIGS. 14A, 14B, 14C, and 14D are views illustrating an example for using a virtual input device in an example electronic device according to an embodiment.

Referring to FIGS. 14A, 14B, 14C, and 14D, according to an embodiment, the electronic device (e.g., the electronic device 101 of FIG. 1 or the electronic device 201 of FIG. 2) may identify the user input according to the movement of the user's hand 421 on, e.g., the first button 521 and perform user interaction corresponding to the user input as shown in FIG. 14A. When the position of the hand 421 departs off the area (or detection area) 1401 of the first button 521 and is detected in another adjacent area while performing the user interaction operation as shown in FIG. 14B, the electronic device may extend the area of the first button 521 to the other area to set a corrected area 1403 for processing user interaction as shown in FIG. 14C. The electronic device may process user interaction in the corrected area 1403 while the user interaction is continuously maintained. The electronic device may change the position of the first button 521 to the position where the hand 421 is detected and display an image (e.g., 3D image) corresponding to the first button 521 in the changed position. As shown in FIG. 14D, although the area (or detection area) of the first button 521 is left while the same user interaction for the first button 521 lasts, the electronic device may determine that the user interaction is valid and process the user interaction and execute a corresponding event (e.g., a command to execute the function of the designated application in response to the user interaction).

According to an embodiment, when the user interaction does not continue but stops, the electronic device may reset the detection area of the first button 521 for the next user interaction from the correction area to the pre-correction area.

According to an embodiment, a method for operation in an electronic device (e.g., the electronic device 101 of FIG. 1 or the electronic device 201 of FIG. 2) may include obtaining an image corresponding to a real drawing, by a camera module (e.g., the camera module 180 of FIG. 1 or the camera module 220 of FIG. 2) of the electronic device, detecting an outline of at least one object included in the image, obtaining at least one virtual button corresponding to a pattern of the outline of the at least one object, deploying the at least one virtual button in an area of the at least one object matching at least one real object included in the real drawing, and processing a user interaction corresponding to a user input according to a movement of button control in an area of the at least one virtual button.

According to an embodiment, the method may further include executing an event corresponding to the user interaction and displaying, on a display module (e.g., the display module 160 of FIG. 1 or the display module 230 of FIG. 2) of the electronic device, a dynamic image corresponding to the user input according to the movement of button control and information related to the event.

According to an embodiment, the method may further include displaying, on the display module, the at least one virtual button deployed in the area of the at least one virtual button based on deployment information.

According to an embodiment, deploying the at least one virtual button may include obtaining deployment information about the at least one virtual button from a memory (e.g., the memory 130 of FIG. 1 or the memory 280 of FIG. 2) of the electronic device or an external electronic device and deploying the at least one virtual button in the area of the at least one virtual button based on the deployment information, wherein the at least one virtual button is matched with the at least one object.

According to an embodiment, deploying the at least one virtual button may further include, based on identifying that the at least one virtual button matching the deployment information does not exist, deploying the at least one virtual button in a position selected by a user.

According to an embodiment, detecting the outline of the at least one object may include detecting the outline of the at least one object by filtering a meaningless outline from the image.

According to an embodiment, the method may further include identifying a recognition rate of the at least one virtual button while processing the user interaction and, when the recognition rate of the at least one virtual button is a designated threshold value or less, identifying a position where the at least one virtual button is deployed based on a feature point of a surrounding area of the at least one virtual button or a deployment position of another virtual button deployed in the surrounding area.

According to an embodiment, the method may further include, when the user interaction is identified in a position out of the area of the at least one virtual button, setting an extension line of a first position where the user interaction occurs and a second position where a user interaction has occurred before, identifying the at least one virtual button included on the extension line, when a distance between a point where the at least one virtual button meets the extension line and the first position is within a designated distance, correcting and processing an error in the user interaction, and executing an event corresponding to the user interaction.

According to an embodiment, the method may further include, when a user's body part is not detected in the area of the at least one virtual button while processing the user interaction, extending an area for identifying the user interaction while the user interaction is maintained, correcting a deployment position of the at least one virtual button into a position where the body part is detected in the extended area, and executing an event corresponding to the user interaction.

According to an embodiment, the method may further include resetting the corrected area to the area when the user interaction is stopped.

According to an embodiment, there may be provided a non-transitory storage medium storing a program including instructions that, when executed by a processor (e.g., the processor 120 of FIG. 1 or the processor 210 of FIG. 2) of an electronic device (e.g., the electronic device 101 of FIG. 1 or the electronic device 201 of FIGS. 2 and 3), enable the electronic device to obtain an image corresponding to a real drawing by a camera module (e.g., the camera module 180 of FIG. 1 or the camera module 220 of FIG. 2) of the electronic device, detect an outline of at least one object included in the image, obtain at least one virtual button corresponding to a pattern of the outline of the at least one object, deploy the at least one virtual button in an area of the at least one object matching at least one real object included in the real drawing, and process a user interaction corresponding to a user input according to a movement of button control in an area of the at least one virtual button.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory;
   a camera; and
   at least one processor, comprising processing circuitry, electrically connected with the memory and the camera,
   wherein the memory stores instructions which, when executed by the at least one processor individually or collectively, cause the electronic device to:
      obtain an image corresponding to a real drawing, by the camera,
      detect an outline of at least one object included in the image,
      obtain at least one virtual button corresponding to a pattern of the outline of the at least one object,
      deploy the at least one virtual button at a first position corresponding to at least one real object included in the real drawing,
      process a user interaction corresponding to a user input according to a movement of button control in an area of the at least one virtual button,
      identify, while processing the user interaction, a recognition rate of recognizing the at least one virtual button,
      based on the recognition rate being less than or equal to a threshold value, identify a position where the at least one virtual button is deployed based on a feature point of a surrounding area of the at least one virtual button or a deployment position of another virtual button deployed in the surrounding area, and redeploy the at least one virtual button at the identified position.

2. The electronic device of claim 1, further comprising a display electrically connected with the at least one processor,
   wherein the memory stores instructions which, when executed by at least one processor individually or collectively, cause the electronic device to:
      execute an event corresponding to the user interaction, and
      display on the display a dynamic image corresponding to the user input according to the movement of button control and information related to the event.

3. The electronic device of claim 2, wherein the memory stores instructions which, when executed by the at least one processor individually or collectively, cause the electronic device to display on the display the at least one virtual button deployed at the first position based on deployment information.

4. The electronic device of claim 1, wherein the memory stores instructions which, when executed by the at least one processor individually or collectively, cause the electronic device to:
obtain deployment information about the at least one virtual button from the memory or an external electronic device, and
deploy the at least one virtual button at the first position based on the deployment information, wherein the at least one virtual button is matched with the at least one object.

5. The electronic device of claim 4, wherein the memory stores instructions which, when executed by the at least one processor individually or collectively, cause the electronic device to:
based on identifying that the at least one virtual button does not match the deployment information, deploy the at least one virtual button at a user-selected second position.

6. The electronic device of claim 1, wherein the memory stores instructions which, when executed by the at least one processor individually or collectively, cause the electronic device to filter a meaningless outline from the image and detect an outline of the at least one object.

7. The electronic device of claim 1, wherein the memory stores instructions which, when executed by the at least one processor individually or collectively, cause the electronic device to:
based on identifying user interaction at a position outside of an area of the at least one virtual button, set an extension line of one position where the user interaction occurs and another position where user interaction has previously occurred,
identify the at least one virtual button as being included on the extension line,
based on a distance between a point where the at least one virtual button meets the extension line and the first position being within a designated distance, correct and process an error in the user interaction, and
execute an event corresponding to the user interaction.

8. The electronic device of claim 1, wherein the memory stores instructions which, when executed by the at least one processor individually or collectively, cause the electronic device to:
based on a user body part being detected in another area adjacent to an area of the at least one virtual button while processing the user interaction, set a corrected area by extending the area to the other area while the user interaction is maintained,
change a deployment position of the at least one virtual button to a position where the body part is detected in the corrected area and execute an event corresponding to the user interaction, and
reset the corrected area to the area when the user interaction stops.

9. A method for operation in an electronic device, the method comprising:
obtaining an image corresponding to a real drawing by a camera of the electronic device;
detecting an outline of at least one object included in the image;
obtaining at least one virtual button corresponding to a pattern of the outline of the at least one object;
deploying the at least one virtual button at a first position corresponding to at least one real object included in the real drawing;
processing a user interaction corresponding to a user input according to a movement of button control in an area of the at least one virtual button;
identifying, while processing the user interaction, a recognition rate of recognizing the at least one virtual button; and
based on the recognition rate of being less than or equal to a threshold value, identifying a position where the at least one virtual button is deployed based on a feature point of a surrounding area of the at least one virtual button or a deployment position of another virtual button deployed in the surrounding area, and redeploying the at least one virtual button at the identified position.

10. The method of claim 9, further comprising:
executing an event corresponding to the user interaction; and
displaying, on a display of the electronic device, a dynamic image corresponding to the user input according to the movement of button control and information related to the event.

11. The method of claim 10, further comprising displaying, on the display, the at least one virtual button deployed at the first position based on deployment information.

12. The method of claim 9, wherein deploying the at least one virtual button includes,
obtaining deployment information about the at least one virtual button from a memory of the electronic device or an external electronic device; and
deploying the at least one virtual button at the first position based on the deployment information, wherein the at least one virtual button is matched with the at least one object.

13. The method of claim 12, wherein deploying the at least one virtual button further includes:
based on identifying that the at least one virtual button does not match the deployment information, deploying the at least one virtual button at a user-selected second position.

14. The method of claim 9, wherein detecting the outline of the at least one object includes detecting the outline of the at least one object by filtering a meaningless outline from the image.

15. The method of claim 9, further comprising:
based on identifying the user interaction at a position outside of an area of the at least one virtual button, setting an extension line of one position where the user interaction occurs and another position where user interaction has previously occurred;
identifying the at least one virtual button as being included on the extension line;
based on a distance between a point where the at least one virtual button meets the extension line and the first position being within a designated distance, correcting and processing an error in the user interaction; and
executing an event corresponding to the user interaction.

16. The method of claim 9, further comprising:
based on a user body part not being detected in the area of the at least one virtual button while processing the user interaction, extending an area for identifying the user interaction while the user interaction is maintained;

correcting a deployment position of the at least one virtual button to a position where the body part is detected in the extended area; and executing an event corresponding to the user interaction.

17. The method of claim 16, further comprising resetting the extended area to the area when the user interaction stops.

18. A non-transitory storage medium storing a program including instructions that, when executed by at least one processor of an electronic device, enable the electronic device to:

obtain an image corresponding to a real drawing by a camera of the electronic device;

detect an outline of at least one object included in the image;

obtain at least one virtual button corresponding to a pattern of the outline of the at least one object;

deploy the at least one virtual button at a first position corresponding to at least one real object included in the real drawing;

process a user interaction corresponding to a user input according to a movement of button control in an area of the at least one virtual button;

identify, while processing the user interaction, a recognition rate of recognizing the at least one virtual button; and based on the recognition rate being less than or equal to a threshold value, identify a position where the at least one virtual button is deployed based on a feature point of a surrounding area of the at least one virtual button or a deployment position of another virtual button deployed in the surrounding area, and redeploy the at least one virtual button at the identified position.

* * * * *